US012454057B2

(12) United States Patent
Kim et al.

(10) Patent No.: US 12,454,057 B2
(45) Date of Patent: Oct. 28, 2025

(54) SYSTEM FOR COMPONENT FASTENING SYSTEM USING COOPERATIVE ROBOT AND FASTENING METHOD THEREOF

(71) Applicant: HYUNDAI MOBIS CO., LTD., Seoul (KR)

(72) Inventors: Young Min Kim, Osan-si (KR); Hun Chul Kim, Seoul (KR); Dong Jin Yoon, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 257 days.

(21) Appl. No.: 17/749,469

(22) Filed: May 20, 2022

(65) Prior Publication Data

US 2022/0410396 A1 Dec. 29, 2022

(30) Foreign Application Priority Data

Jun. 23, 2021 (KR) .................. 10-2021-0081290

(51) Int. Cl.
 B25J 9/00 (2006.01)
 B25J 9/16 (2006.01)
 B25J 13/08 (2006.01)
(52) U.S. Cl.
 CPC .......... B25J 9/1682 (2013.01); B25J 9/1664 (2013.01); B25J 9/1669 (2013.01); B25J 9/1697 (2013.01); B25J 13/086 (2013.01)
(58) Field of Classification Search
 CPC ...... B25J 9/1682; B25J 9/1664; B25J 9/1669; B25J 9/1697; B25J 13/086; B25J 9/1687; B25J 9/0084; B25J 9/1676; B25J 15/0038; B25J 15/0052; B25J 19/023; G05B 2219/40584
 See application file for complete search history.

(56) References Cited

U.S. PATENT DOCUMENTS

| 10,968,051 | B1* | 4/2021 | Tomasetta | .............. B65G 61/00 |
| 2002/0157241 | A1* | 10/2002 | Yamamoto | ............ B23P 21/004 29/784 |
| 2011/0048649 | A1* | 3/2011 | Komatsu | ................ B62D 65/12 157/1.35 |

(Continued)

FOREIGN PATENT DOCUMENTS

| EP | 3 421 172 A1 | 1/2019 |
| JP | 2010-264907 A | 11/2010 |

(Continued)

OTHER PUBLICATIONS

Singapore Office Action issued on Date in corresponding Singapore Patent Application No. 10202250256E. (13 pages in English).

*Primary Examiner* — Bao Long T Nguyen
*Assistant Examiner* — Tien Minh Le
(74) *Attorney, Agent, or Firm* — NSIP Law (57) ABSTRACT

A parts fastening system using a cooperative robot that fastens a module part to a fastening target includes: a jig to load the module part at a predetermined position; a loading robot to grip the module part loaded on the jig, and to move and align the module part to a fastening area in which the module part is fastened to the fastening target; a fastening robot including a first camera, the fastening robot to fasten the module part to the fastening target; and a control device to control movements of the loading robot and the fastening robot.

15 Claims, 9 Drawing Sheets

(56) References Cited

U.S. PATENT DOCUMENTS

| | | | | |
|---|---|---|---|---|
| 2015/0127141 A1* | 5/2015 | Kawada | ............... | B25J 13/085 |
| | | | | 700/206 |
| 2019/0030588 A1* | 1/2019 | Hirai | ..................... | B64F 5/10 |
| 2019/0358816 A1 | 11/2019 | Saito et al. | | |
| 2020/0147703 A1* | 5/2020 | Eto | ..................... | B23Q 3/064 |
| 2020/0232777 A1* | 7/2020 | Kurokami | ............ | G01B 5/0004 |
| 2023/0001589 A1* | 1/2023 | Fleming | ............... | B25J 15/0253 |

FOREIGN PATENT DOCUMENTS

| | | |
|---|---|---|
| JP | 2015-226966 A | 12/2015 |
| JP | 2019-25625 A | 2/2019 |
| JP | 6555271 B2 | 8/2019 |
| WO | WO 2016/119829 A1 | 8/2016 |

* cited by examiner

SYSTEM FOR COMPONENT FASTENING SYSTEM USING COOPERATIVE ROBOT AND FASTENING METHOD THEREOF

CROSS-REFERENCE TO RELATED APPLICATION

This application claims priority to and the benefit of Korean Patent Application No. 10-2021-0081290, filed on Jun. 23, 2021, the disclosure of which is incorporated herein by reference in its entirety.

TECHNICAL FIELD

The present disclosure relates to a parts fastening system using a cooperative robot and a fastening method thereof.

BACKGROUND

The content described in this section merely provides background information for the present disclosure and does not constitute the prior art.

The smart factory field is being applied to the industry as a whole, and assembling each part of a product is automated by a robot. Robots for assembling products generally include a loading robot, a fastening robot, and a parts supply robot. The loading robot serves to grip module parts and move and align them to a fastening position of a fastening target, and the fastening robot serves to fasten the module parts aligned by the loading robot to the fastening target. The parts supply robot serves to supply the parts to be gripped by the loading robot from the outside.

Each of the loading robot, the fastening robot, and the parts supply robot is equipped with a camera that provides vision to each robot for precise control. The locating and controlling using vision guarantees precision, but has the disadvantage of delaying work time. In addition, due to a camera mounted to each robot, a driving range of each robot is limited and a load is applied to each robot by the weight of the camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a parts fastening system using a cooperative robot that fastens a module part to a fastening target includes: a jig configured to load the module part at a predetermined position; a loading robot configured to grip the module part loaded on the jig, and to move and align the module part to a fastening area in which the module part is fastened to the fastening target; a fastening robot including a first camera, the fastening robot configured to fasten the module part to the fastening target; and a control device configured to control movements of the loading robot and the fastening robot.

The system may include a parts supply robot configured to load the module part to the predetermined position on the jig.

When the loading robot aligns the module part to the fastening area, the control device may control the loading robot using the first camera.

The jig may include a proximity sensor configured to detect whether the module part is loaded on the jg.

The control device may be configured to receive a detection signal from the proximity sensor to determine whether the module part is loaded on the jig.

The loading robot may be disposed in a first intermediate area away from a driving radius of the parts supply robot such that the loading robot does not physically interfere with a movement of the parts supply robot while the parts supply robot loads the module part on the jig.

The jig may be formed such that the module part is disposed at different predetermined positions according to a shape of the module part.

In another general aspect, a parts fastening method using a cooperative robot that fastens a module part to a fastening target includes: a determination process of determining whether the module part is loaded at a predetermined position on a jig; a gripping process of controlling the loading robot to grip the module part; an alignment process of controlling the loading robot to align the module part with the fastening target in a fastening area; and a fastening process of controlling the fastening robot to fasten the module part to the fastening target.

The gripping process may be performed by position-based control of the loading robot.

The alignment process may be performed by controlling the loading robot based on vision information collected using a first camera disposed on the fastening robot.

The fastening process may include: a partial fastening process in which the fastening robot fastens only a portion of a plurality of fastening parts connecting the module part and the fastening target; a retraction process performed after the partial fastening process, in which the loading robot retracts from the fastening area; and a remaining fastening process performed after the retraction process, in which the fastening robot fastens a remaining portion of the plurality of fastening parts.

The method may include a loading process of controlling a parts supply robot to load the module part at the predetermined position on the jig before the determination process.

The loading process may be performed while one or both of the alignment process and the fastening process are performed.

The determination process may include determining whether the module part is loaded at the predetermined position using a proximity sensor disposed on the jig.

In the gripping process and the alignment process, the control of the loading robot may be performed based on vision information acquired by a camera disposed with the loading robot.

Other features and aspects will be apparent from the following detailed description, the drawings, and the claims.

DETAILED DESCRIPTION

The present disclosure provides a parts fastening system and a parts fastening method capable of shortening a work time for fastening parts.

In addition, the present disclosure provides a parts fastening system and a parts fastening method capable of extending a driving range of each robot and reducing a load of a loading robot.

In addition, the present disclosure provides a parts fastening system and a parts fastening method capable of reducing the production cost of the parts fastening system using a cooperative robot.

The problems to be solved by the present disclosure are not limited to the problems mentioned above, and other problems not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 1:
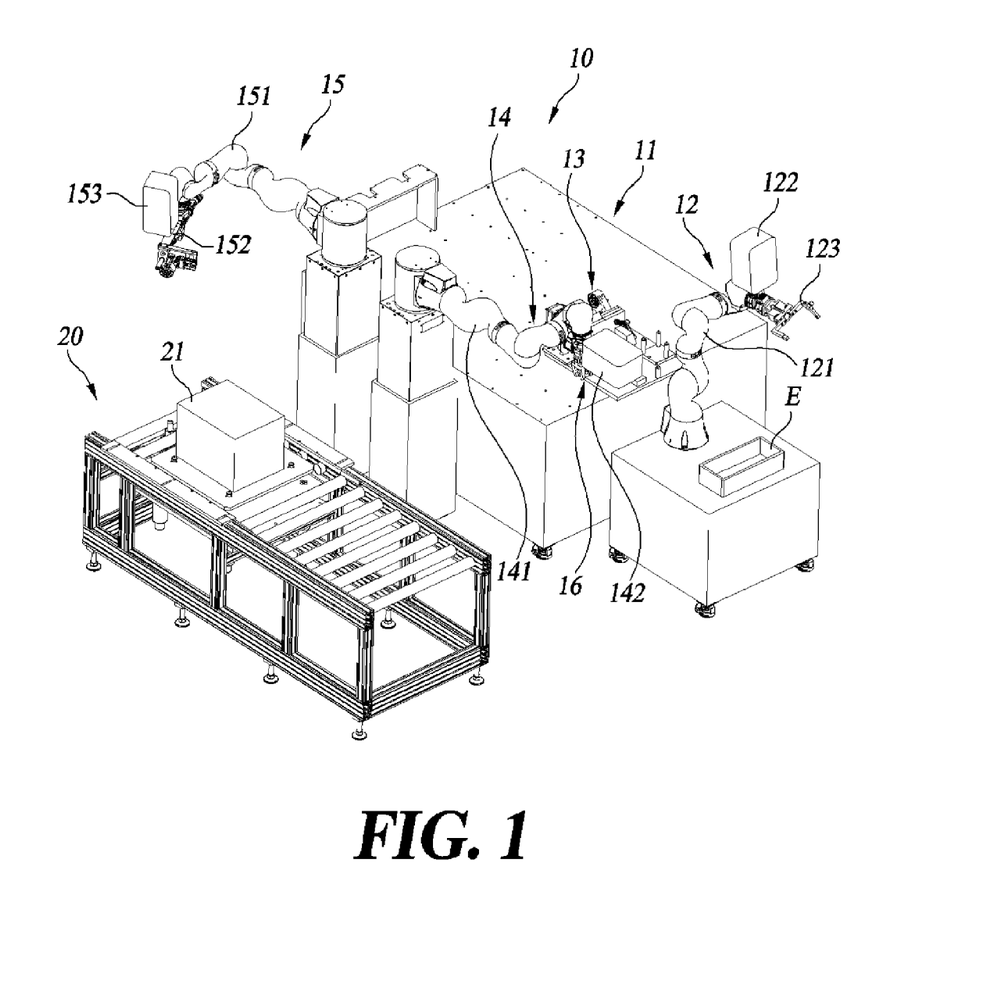
FIG. 1 is a perspective view of a parts fastening system using a cooperative robot according to one embodiment of the present disclosure.
Figure 2:
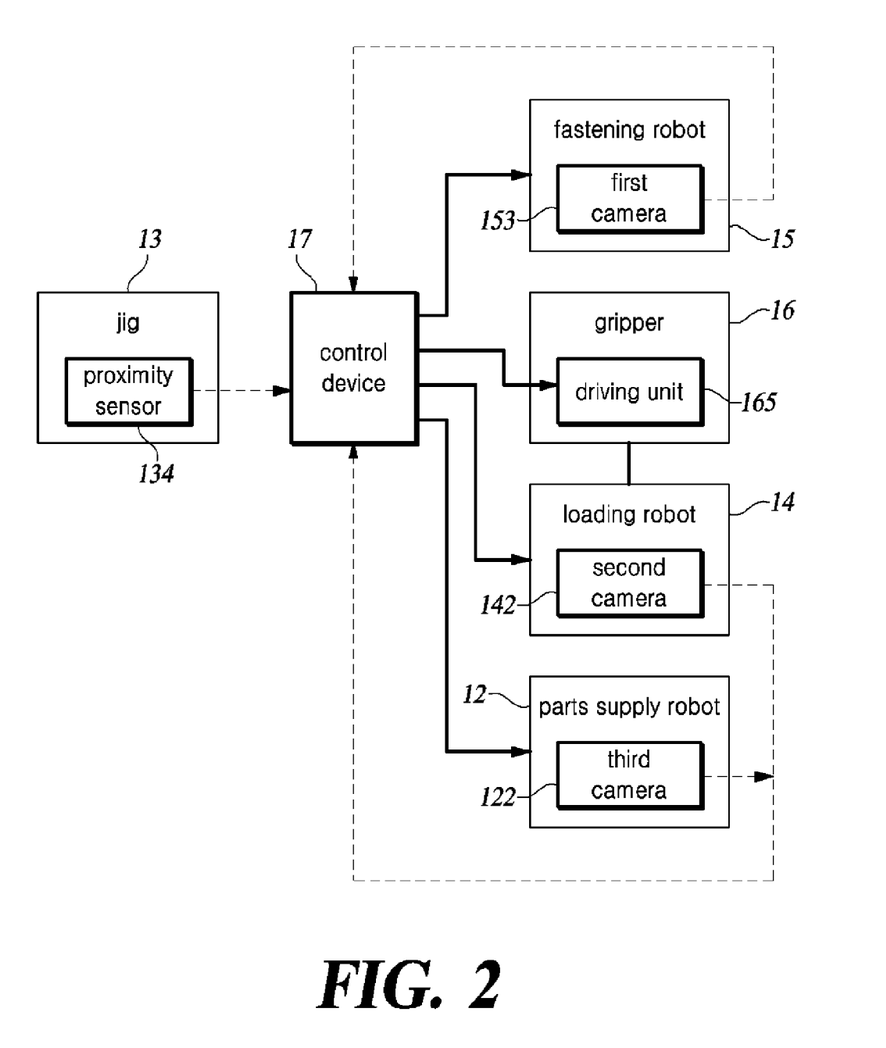
FIG. 2 is a block diagram of the parts fastening system using the cooperative robot according to one embodiment of the present disclosure.

FIG. 1 is a perspective view of a parts fastening system using a cooperative robot according to one embodiment of the present disclosure. FIG. 2 is a block diagram of the parts fastening system using the cooperative robot according to one embodiment of the present disclosure. Here, the cooperative robot includes a loading robot 14 and a fastening robot 15.

The parts fastening system 10 using the cooperative robot includes all or part of a base 11, a parts supply robot 12, a jig 13, a loading robot 14, a fastening robot 15 and a control device 17.

The control device 17 is configured to control movements of the loading robot 14, the fastening robot 15, and the parts supply robot 12. The control device 17 may include a loading robot controller for controlling the movement of the loading robot 14, a fastening robot controller for controlling the movement of the fastening robot 15, and a parts supply robot controller for controlling the movement of the parts supply robot 12. The controller may be disposed adjacent to each other, or may be disposed to be spaced apart from each other so as to be adjacent to the respective robots. Alternatively, the controls of the controllers may be performed within the control device 17.

The loading robot 14 grips a module part 132 fixedly loaded on the jig 13 and moves and aligns the module part 132 to a fastening area where the module part 132 is to be fastened to a fastening target 21. The fastening target 21 is moved by a device such as a conveyor belt 20 and is disposed in the fastening area. Here, the fastening area is an area on the conveyor belt 20 within a moving radius of the loading robot 14 and the fastening robot 15, in which the module part 132 can be fastened by the loading robot 14 and the fastening robot 15.

The loading robot 14 may include a second manipulator 141, a second camera 142, and a gripper 16. One end of the second manipulator 141 is fixed to the base 11 and the other end is connected to the gripper 16.

The second manipulator 141 and the gripper 16 are configured to be detachable, and the loading robot 14 can be used by replacing different types of grippers 16 depending on the shape of the module part 132.

The second camera 142 is arranged to capture an image in the direction toward the gripper 16. The second camera 142 provides a vision so that the loading robot 14 can precisely grip the module part 132 loaded on the jig 13 when gripping it. For example, the loading robot 14 may align the module part 132 to the fastening target 21 based on the vision information obtained from the second camera 142. In other words, in two different processes, for example, in a gripping process (S320, see FIG. 9) and an alignment process (S340, see FIG. 9), the control of the loading robot 14 may be performed based on the vision information acquired through the same second camera 142 disposed on the loading robot 14.

Meanwhile, the second camera 142 may be omitted from the loading robot 14. In this case, the loading robot 14 may grip the module part 132 on the jig 13 using position-based control rather than vision-based control. A control method when the second camera 142 is omitted will be described later.

The fastening robot 15 fastens the fastening target 21 and the module part 132. The fastening robot 15 may include a first manipulator 151, a first camera 153, and a fastening tool 152. One end of the first manipulator 151 is fixed to the base 11 and the other end is connected to the fastening tool 152.

The fastening robot 15 may align the fastening tool 152 in the fastening area using the vision captured by the first camera 153. The first camera 153 may be arranged to capture an image in the direction in which the fastening tool 152 faces. The fastening robot 15 may drive the first manipulator 151 to move the fastening tool 152 to the fastening area to fasten the fastening target 21 and the module part 132.

The loading robot 14 is controlled by the loading robot controller. In order to fasten the module part 132 to the fastening target 21, the loading robot controller controls the loading robot 14 to grip the module part 132 loaded on the jig 13 using the position-based control and move the module part 132 to the fastening area. The loading robot 14 can move the module component 132 on the jig 13 to the fastening area more quickly by performing the position-based control without using a camera.

When the loading robot 14 moves the module part 132 to the fastening area, the loading robot controller may perform control using the first camera 153 disposed on the fastening robot 15. In order to fasten the module part 132 to the fastening target 21, the module part 132 needs to be aligned at an accurate position and in an accurate orientation. To this end, the module part 132 is aligned using the first camera 153 of the fastening robot 15. At this time, the fastening robot 15 is driven so that the first camera 153 can provide the fastening target side vision.

After the loading robot 14 moves the module part 132 to the fastening area, the fastening robot controller uses the first camera 153 disposed on the fastening robot 15 to control the fastening robot 15 to fasten the module part 132 to the fastening target 21.

The loading robot 14 is located in a first intermediate region away from the driving radius of the parts supply robot 12 so as not to physically interfere with the movement of the parts supply robot 12 before being driven by the loading robot controller. In this case, the first intermediate region means a region that exists between the fastening area and a region in which the loading robot 14 grips the module part 132 within the driving range of the loading robot 14.

After the loading robot 14 moves the module part 132 to the fastening area, the fastening robot controller controls the fastening robot 15 to fasten the module part 132 to the fastening target 21 using the first camera 153 disposed on the fastening robot 15.

The parts supply robot 12 receives the module part 132 from the outside and loads the module part 132 at a predetermined position on the jig 13. The parts supply robot 12 may include a third manipulator 121, a third camera 122, and a supply gripper 123. The supply gripper 123 is disposed at one end of the third manipulator 121. The parts supply robot 12 uses the supply gripper 123 to grip the module part 132 in a supply unit E and load it on the jig 13 at a predetermined position. When the parts supply robot 12 grips the module part 132 in the supply unit E, the vision captured by the third camera 122 is used.

Figure 3:
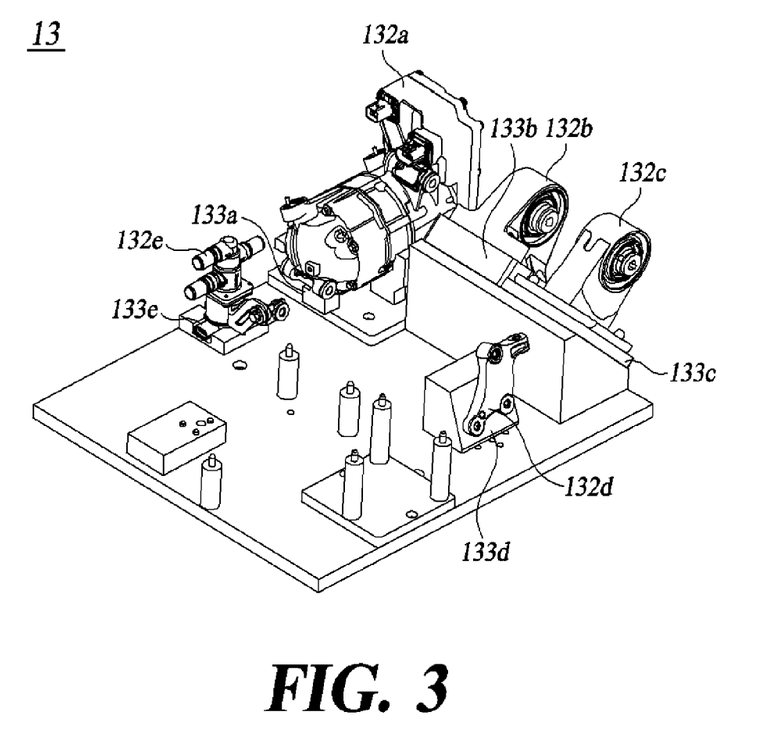
FIG. 3 is a perspective view of a jig of FIG. 1 according to one embodiment of the present disclosure.

FIG. 3 is a perspective view of the jig of FIG. 1 according to one embodiment of the present disclosure.

The jig 13 is provided so that the module part 132 is loaded at a predetermined position. As shown in FIG. 3, the type and shape of the module part 132 to be fastened to the fastening target 21 may vary. The shape of the module part 132 shown in FIG. 3 is exemplary and is not limited thereto.

The jig 13 is formed to match the shape of each module part 132 so that first to fifth module parts 132*a* to 132*e* can be fixed at respective fixed positions. That is, the jig 13 is formed such that different module parts 132 are disposed at different predetermined positions depending on the shapes thereof. The first module part 132*a* is disposed at a first position 133*a*, the second module part 132*b* is disposed at a second position 133*b*, the third module part 132*c* is disposed at a third position 133*c*, the fourth module part 132*d* is disposed at a fourth position 133*d*, and the fifth module part 132*e* is disposed at a fifth position 133*e*. When the second camera 142 of the loading robot 14 is omitted and the position-based control is performed, the features of the jig 13 allow the desired module part 132 to be gripped at a predetermined position in a desired orientation.

In order for the loading robot 14 to grip the module part 132 using the position-based control, the positions at which the first to fifth module parts 132*a* to 132*e* are to be gripped may be stored in advance in the control device 17.

The jig 13 may include a proximity sensor 134 for detecting whether the module part 132 is loaded on the jig 13. A plurality of proximity sensors 134 may be respectively disposed in the first to fifth positions 133*a* to 133*e*. The control device 17 may receive a detection signal from the proximity sensor 134 and determine whether the module part 132 is loaded at a predetermined position on the jig 13.

Figure 4:
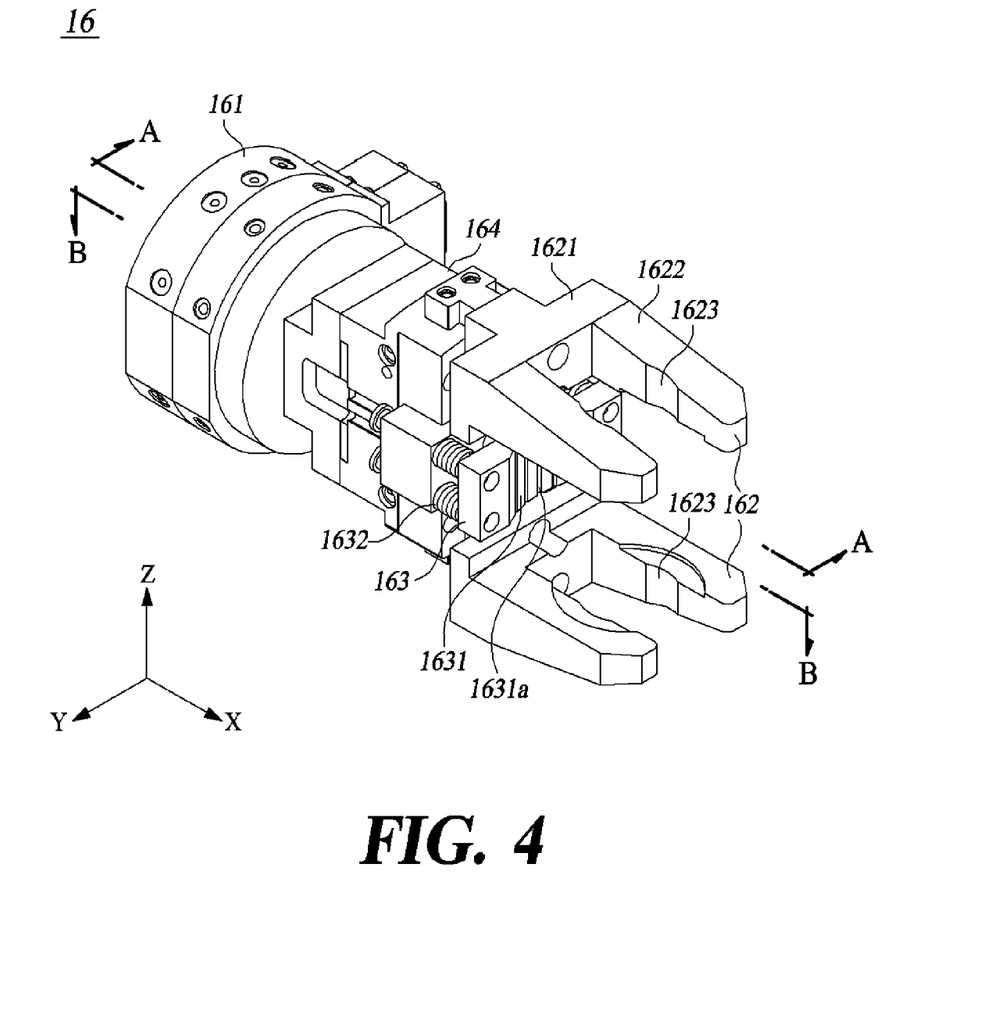
FIG. 4 is a perspective view of a gripper connected to an end of a loading robot of FIG. 1 according to one embodiment of the present disclosure.
Figure 5:
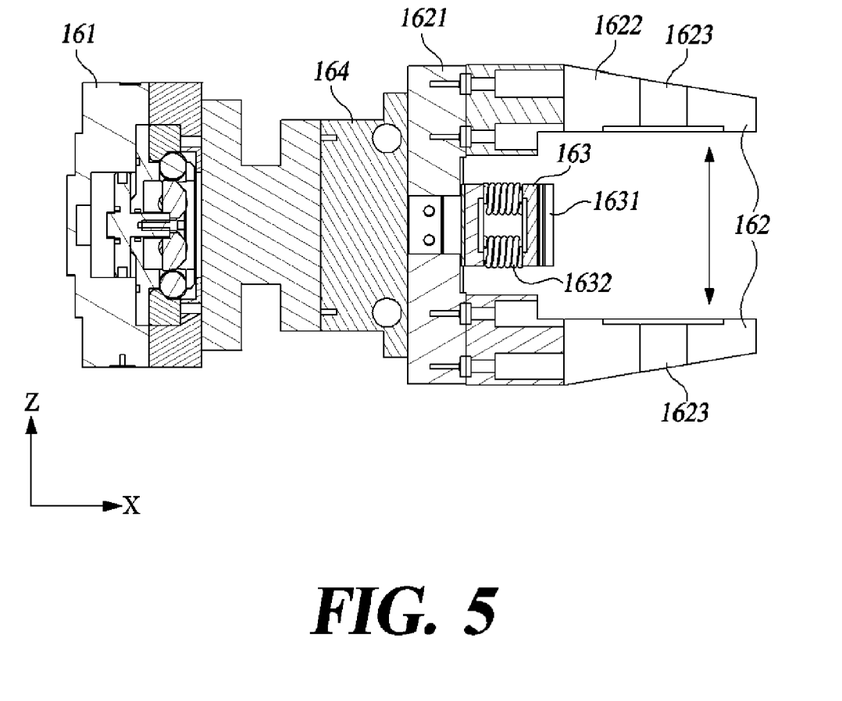
FIG. 5 is a cross-sectional view taken along line A-A of FIG. 4.
Figure 6:
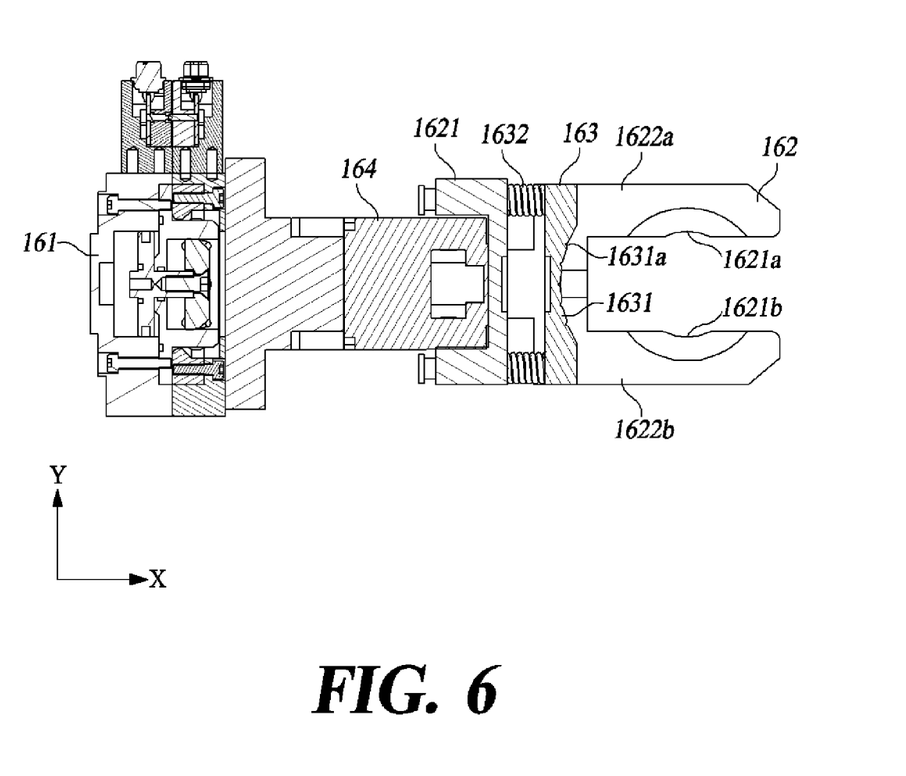
FIG. 6 is a cross-sectional view taken along line B-B of FIG. 4.

FIG. 4 is a perspective view of a gripper connected to an end of the loading robot of FIG. 1 according to one embodiment of the present disclosure. FIG. 5 is a cross-sectional view taken along line A-A of FIG. 4. FIG. 6 is a cross-sectional view taken along line B-B of FIG. 4. The gripper shown in FIGS. 4 to 6 is a gripper used to grip the module parts having various shapes (e.g., the module part 132*b* or 132*c* having a circular shape) in the present disclosure, and grippers having other shapes may also be connected to the end of the second manipulator 141 to be used. Hereinafter, among the module parts, the module part 132*b* or 132*c* whose a cross section of a surface in contact with the gripper has a circular shape will be described as an example.

In this case, the circular module part 132*b* or 132*c* may have a cylindrical shape or a spherical shape, but without being limited thereto, it is sufficient if a portion of the module part 132*b* or 132*c* corresponding to a gripping finger 162 has a certain radius of curvature when the gripper 16 grips the module part. The circular module part 132*b* or 132*c* shown in FIG. 3 is illustrative and the present disclosure is not limited thereto.

Referring to FIGS. 4 to 6, the gripper 16 may include a robot connecting part 161, a gripping finger 162, an elastic pressing part 163, and a driving unit 165.

The gripping finger 162 may include a gripping part 1622. The gripper 16 includes two gripping fingers 162, and the two gripping fingers 162 may be disposed to be symmetrical with respect to the X-Z plane positioned in the center of the gripper 16.

Specifically, the grip finger 162 includes a support portion 1621 in contact with a body 164 and receiving power from the driving unit 165, a first gripping portion 1622*a* having a first gripping groove 1621*a* extending in a longitudinal direction of the body 164 from one end of the support portion 1621, and a second gripping portion 1622*b* having a second gripping groove 1621*b* extending in the longitudinal direction of the body 164 from the other end of the support portion 1621. Here, the longitudinal direction of the body 164 refers to the X-axis direction in FIG. 4. The first gripping groove 1621*a* and the second gripping groove 1621*b* may have the same radius of curvature.

The gripping groove 1621*a* or 1621*b* may be formed in the gripping portion 1622. For example, the shape of the gripping groove 1621*a* or 1621*b* may correspond to the shape of a portion of the circular module part 132*b* or 132*c* in contact with the grip finger 162. For example, the first gripping groove 1621*a* and/or the second gripping groove 1622*a* may have a curvature of a predetermined radius.

The elastic pressing part 163 is disposed adjacent to one end of the body 164 between the two gripping fingers 162. The elastic pressing part 163 may include a plurality of elastic bodies 1632 and a pressing plate. Here, the elastic body 1632 may be a spring.

The plurality of elastic bodies 1632 may be disposed such that one end contacts the body 164 of the gripper 16 and the other end contacts one surface of the pressing plate. When the elastic pressing part 163 is pressed against the body 164 of the gripper 16, an elastic force is provided in the opposite direction of the body 164 by the plurality of elastic bodies 1632.

The pressing plate may be coupled to one ends of the elastic bodies 1632 and disposed to press the circular module part 132*b* or 132*c*. For example, the pressing plate may have a pressing groove 1631 having a specific shape (e.g., an arc shape, a triangle, a square, etc.). The pressing groove 1631 may have an arc shape corresponding to the shape of the portion of the circular module part 132*b* or 132*c* in contact with the elastic pressing part 163. Specifically, the shape of the pressing groove 1631 may correspond to the shape of the portion of the circular module part 132b or 132c in contact with the pressing plate of the elastic pressing part 163. For example, as shown in FIG. 3, when the diameter of the central portion of the circular module part 132b or 132c is larger and the diameter of the ends is smaller, the radius of curvature of the pressing groove 1631 may be formed larger than the radius of curvature of the gripping groove 1621a and 1621b.

The pressing grooves 1631 are formed to be spaced apart by a predetermined distance in the height direction of the grip fingers 162 and may include a plurality of line grooves 1631a extending in a direction perpendicular to the height direction of the grip fingers 162 to form grooves. Here, the height direction of the grip finger 162 means the Y-axis direction in FIG. 4, and the direction perpendicular to the height direction of the grip finger 162 means the Z-axis direction in FIG. 4. According to the above-described line groove 1631a, by further improving the gripping force of the gripping fingers 162, it is possible to more effectively prevent a problem of misalignment due to slipping of module parts during transport and/or fastening.

When the gripper 16 grips the circular module part 132b or 132c, the elastic pressing part 163 comes into contact with a portion of the circular module part 132b or 132c and is pressed in the direction toward the body 164. At this time, the pressing plate presses the circular module part 132b or 132c by the elastic force of the elastic pressing part 163. By the pressing of the pressing plate, the circular module part 132b or 132c may be fixed in the gripper 16 without being rotated.

The robot connection part 161 is adjacent to the other end of the body 164 and is disposed at one end to be connected to the loading robot 14. One end of the second manipulator 141 of the loading robot 14 is also configured to be connectable to the robot connection unit 161.

The driving unit 165 is disposed in the body 164 to move the two gripping fingers 162. The driving unit 165 may move the two gripping fingers 162 away from or closer to each other in the outward direction of the body 164. For example, as shown in FIG. 5, the two gripping fingers may move away from or closer to each other in the Z-axis direction.

Before the gripper 16 grips the circular module part 132b or 132c, the loading robot controller controls the driving unit 165 so that the distance between the two gripping fingers 162 increases. When the gripper 16 grips the circular module part 132b or 132c, the loading robot controller controls the driving unit 165 to decrease the distance between the two gripping fingers 162. When the circular module part 132b or 132c is seated and fixed in the gripping grooves 1621 of the two grippers 16, the circular module part 132b or 132c presses the elastic pressing part 163 and the rotation of the circular module part 132b or 132c is prevented.

Figure 7:
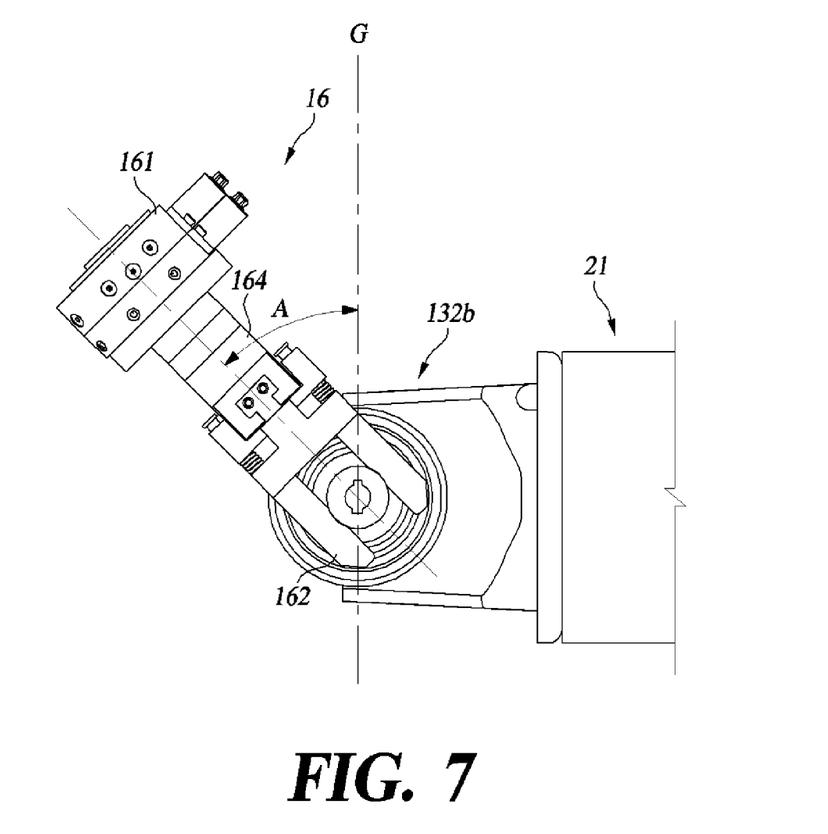
FIG. 7 is a side view illustrating a state in which the gripper grips the circular module part.

FIG. 7 is a side view illustrating a state in which the gripper grips the circular module part.

When the gripper 16 grips the circular module part 132b or 132c by the operation of the driving unit 165, it may grip the circular module part 132b or 132c in a diagonal direction at an angle A with the gravity direction G of the circular module part 132b or 132c. In this way, as shown in FIG. 7, without being interfered with by the loading robot 14, the fastening robot 15 secures enough space to perform the fastening work, so that the fastening work can be smoothly performed. Therefore, the fastening operation can be performed using fastening tools of various shapes without manufacturing the fastening tool of the fastening robot 15 in a specific shape to avoid interference with surrounding structures.

Among the cooperative robots, by mounting the grippers according to FIGS. 4 to 6 to the loading robot 14, the loading robot 14 can grip the circular module parts 132b and 132c and move and fix the circular module parts 132b and 132c to the fastening area. Among the cooperative robots, the fastening robot 15 can fasten the circular module parts 132b and 132c fixed by the loading robot 14.

Figure 8:
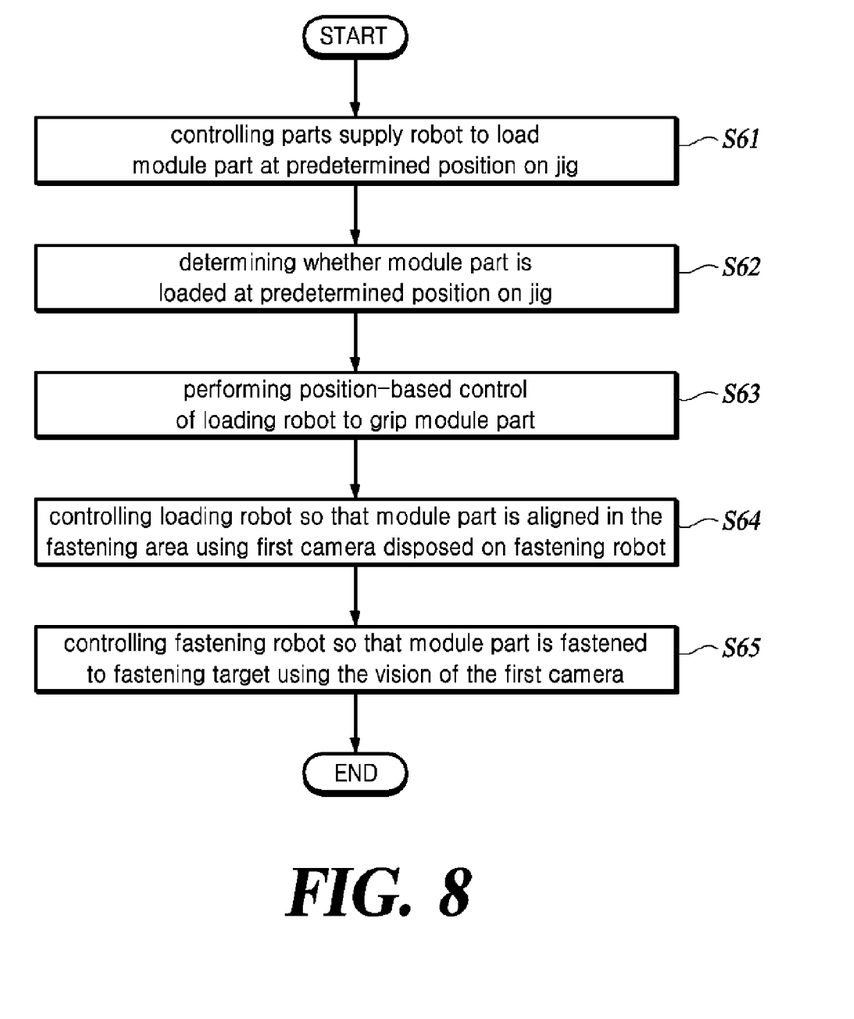
FIGS. 8 and 9 are flowcharts of a method of fastening parts using a cooperative robot according to one embodiment of the present disclosure.
Figure 9:
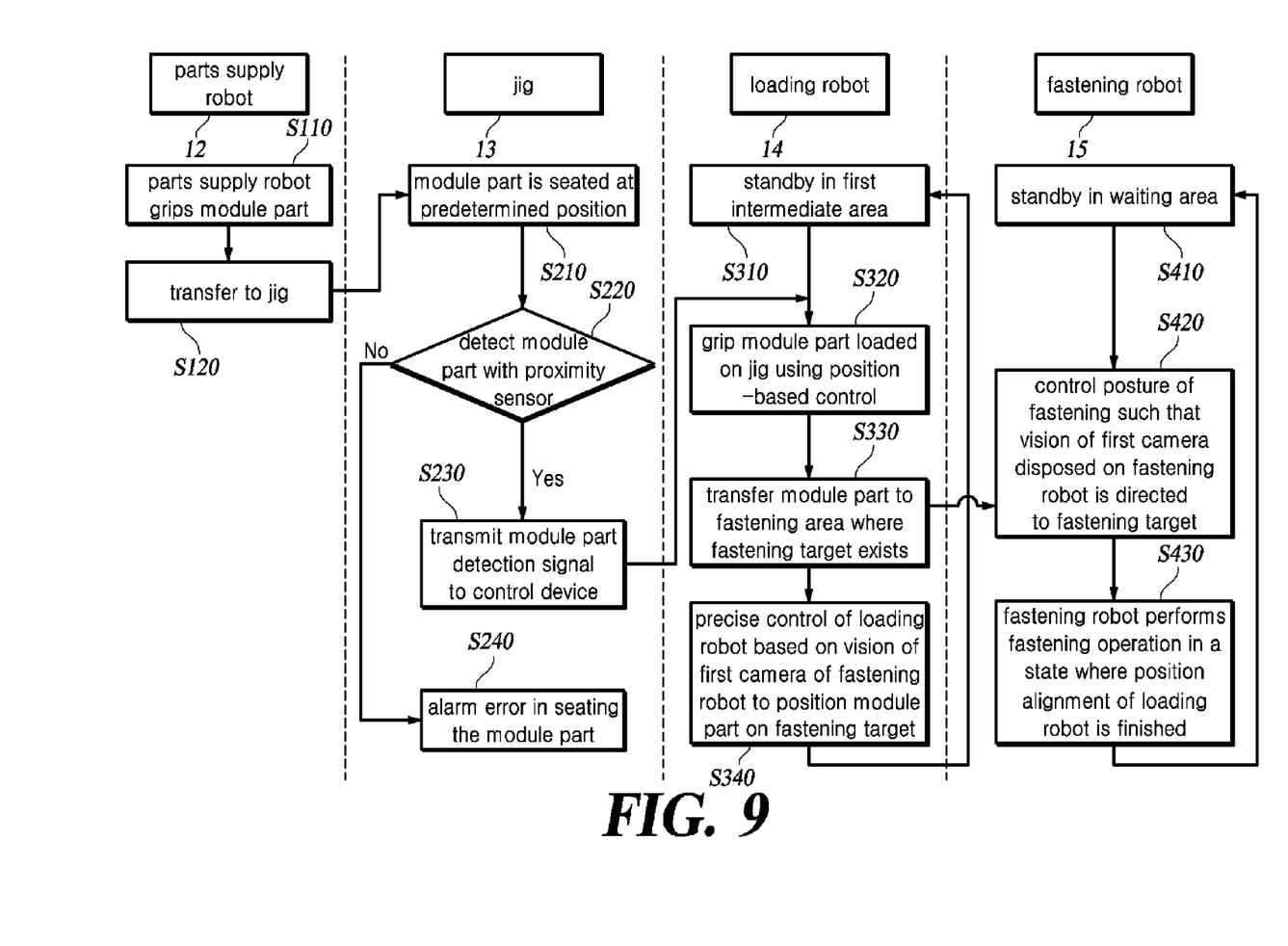

FIGS. 8 and 9 are flowcharts of a method of fastening parts using the cooperative robots according to one embodiment of the present disclosure.

The flowchart shown in FIG. 8 is a flowchart illustrating one of several control processes from gripping the module part 132 from the outside to fastening it to the fastening target 21.

The control device 17 controls the parts supply robot 12 to load the module part 132 at a predetermined position on the jig 13 (S61). For example, as shown in FIG. 3, the parts supply robot 12 loads the first module part 132a to the first position 133a.

The control device 17 determines whether the module part 132 is loaded at a predetermined position on the jig 13 (S62). The jig 13 may include a proximity sensor 134 capable of detecting whether the module part 132 is loaded in a predetermined position. The control device 17 may receive a detection signal from the proximity sensor 134 to determine whether the module part 132 is loaded at a predetermined position on the jig 13.

When it is determined that the module part 132 is loaded at a predetermined position on the jig 13, the control device 17 performs position-based control of the loading robot 14 to grip the module part 132 (S63). Here, the position-based control refers to a control that a position at which each module part 132 is to be gripped is stored in advance and the module part 132 is gripped based on the stored position information without using the vision of the camera. On the other hand, this is only an example, and it is noted that the loading robot 14 may grip and transfer the module part 132 based on the vision captured by the second camera 142.

After the loading robot 14 grips the module part 132, the control device 17 uses the first camera 153 disposed on the fastening robot 15 and controls the loading robot 14 so that the module part 132 is aligned in the fastening area (S64). The control device 17 controls the movement of the fastening robot 15 to control the first camera 153 to provide the fastening area side vision. For example, the first camera 153 may be (i) a 3D vision camera capable of capturing a stereoscopic image, or (ii) a 2.5D vision camera having a depth recognition function in addition to a 2D image. According to this configuration, without moving the fastening robot 15 to adjust the line of sight of the first camera 153, it is possible to obtain sufficient information required for the loading operation and/or the fastening operation.

After the module part 132 is aligned in the fastening area, the control device 17 controls the fastening robot so that the module part 132 is fastened to the fastening target 21 using the vision of the first camera 153 (S65). According to this operation, it is possible to reduce the manufacturing cost and the effort required for maintenance by reducing the total number of cameras.

FIG. 9 is a flowchart showing the control process of each part in the process of operating the parts fastening system using the cooperative robots.

Referring to FIG. 9, the control device 17 may repeatedly perform the control processes of S110 and S120 for the parts supply robot 12, the control processes of S210 to S240 for the jig 13, the control processes of S310 to S340 for the loading robot 14, and the control processes of S410 to S430 for the fastening robot 15. Hereinafter, the control device 17 divided into the parts supply robot controller, the loading robot controller and the fastening robot controller will be described.

The parts supply robot controller controls the parts supply robot 12 to grip the module parts 132 at the outside (S110). After the parts supply robot 12 grips the module part 132, the parts supply robot controller controls the parts supply robot 12 to transfer the module part 132 to the jig 13 (S120).

The parts supply robot controller controls the parts supply robot 12 so that the module part 132 transferred to the jig 13 are seated at a predetermined position on the jig 13 (S210). Thereafter, the proximity sensor 134 is used to determine whether the module part 132 has been detected (S220). When the proximity sensor 134 does not detect the module part 132, an error in seating the module part 132 is alarmed (S240). When the proximity sensor 134 detects the module part 132, the detection signal of the proximity sensor 134 is transmitted to the loading robot controller (S230).

Before receiving the detection signal for the module part 132, the loading robot controller controls the loading robot 14 to standby in the first intermediate area (S310). The first intermediate region means a region that exists between the fastening area and the region in which the loading robot 14 grips the module part 132 within the driving range of the loading robot 14.

After the loading robot controller receives the detection signal for the module part 132, it controls the loading robot 14 to grip the module part 132 loaded on the jig 13 using position-based control (S320). After the loading robot 14 grips the module part 132, the loading robot controller controls the loading robot 14 to transfer the module part 132 to the fastening area where the fastening target 21 exists (S330).

When the module part 132 is moved to the fastening area, the loading robot controller transmits a fastening signal to the fastening robot controller.

The fastening robot controller controls the fastening robot 15 to stand by in the waiting area before receiving the fastening signal (S410). The waiting area means an area that does not interfere with the driving radius of the loading robot 14 when the fastening robot 15 does not operate.

When the fastening robot controller receives the fastening signal, the fastening robot controller controls the fastening robot 15 to move to a second intermediate region, and controls the posture of the fastening robot 15 such that the vision of the first camera 153 disposed on the fastening robot 15 is directed to the fastening target 21 (S420). Here, the second intermediate region means an area between the standby region and the fastening region within the driving range of the fastening robot 15.

The loading robot controller precisely controls the loading robot 14 based on the vision of the first camera of the fastening robot 15 after the process S420 to position the module part 132 on the fastening target 21 (S340).

The fastening robot controller controls the fastening robot 15 to perform the fastening operation in a state where the module part 132 is positioned on the fastening target 21 and the position alignment of the loading robot 14 is finished (S430).

For example, in performing the processes S340 and S430, in a state that the loading robot 14 aligns the module part 132 with the fastening target 21, the fastening robot 15 performs fastening operation for at least one of a plurality of fastening parts connecting the module part 132 and the fastening target 21. For example, in a state that the fastening robot 15 has performed the fastening operation for only some of the plurality of fastening parts (partial fastening process), the loading robot 14 retreats from the fastening area (retraction process), and the fastening robot 15 performs the fastening operation for the remaining fastening parts (remaining fastening process).

In this way, it is possible to efficiently secure a space for the fastening operation of the fastening robot 15.

For example, while the alignment process (S340) and/or the fastening process (S430) is being performed, the loading process (S210) is performed, and the gripping process is immediately performed after the alignment process (S340) without the waiting process (S310). In this way, the time required in the waiting process (S310) can be reduced.

According to one embodiment, in the parts fastening system using the cooperative robot, no camera is disposed on the loading robot and the position control is performed when the loading robot grips the module parts on the jig, so that the work time is shortened and the production cost is reduced.

According to one embodiment, since no camera is disposed on the loading robot, the load applied to the loading robot can be reduced and the driving range of the loading robot can be extended.

Although exemplary embodiments of the present disclosure have been described for illustrate purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A parts fastening system using a cooperative robot that fastens a module part to a fastening target, the system comprising:
   a jig configured to load module parts having different shapes at predetermined positions;
   a loading robot comprising a gripper configured to grip the module part loaded on the jig, and to move and align the module part to a fastening area in which the module part is fastened to the fastening target;
   a fastening robot including a first camera, the fastening robot configured to fasten the module part to the fastening target; and
   a controller configured to control movements of the loading robot and the fastening robot,
   wherein the loading robot includes a gripper interface configured to allow automatic replacement of different types of grippers,
   wherein the controller is configured to select and replace a gripper type based on shape recognition of the module part to be gripped, prior to the gripping operation; and
   the loading robot is configured to grip the module part based on a predetermined position of the module art, without using a camera.

2. The system of claim 1, further comprising:
   a parts supply robot configured to load the module part to the predetermined position on the jig.

3. The system of claim 2, wherein when the loading robot aligns the module part to the fastening target, the controller controls the loading robot using the first camera.

4. The system of claim 2, wherein the loading robot is disposed in a first intermediate area away from a driving radius of the parts supply robot such that the loading robot does not physically interfere with a movement of the parts supply robot while the parts supply robot loads the module part on the jig.

5. The system of claim 1, wherein the jig includes a proximity sensor configured to detect whether the module part is loaded on the jig.

6. The system of claim 5, wherein the controller is configured to receive a detection signal from the proximity sensor to determine whether the module part is loaded on the jig.

7. The system of claim 1, wherein the jig is formed such that the module part is disposed at different predetermined positions according to a shape of the module part.

8. A parts fastening method using a cooperative robot that fastens a module part to a fastening target, the method comprising:

a determination process of determining whether module parts having different shapes are loaded at predetermined positions on a jig;

a gripping process of controlling a loading robot comprising a gripper to grip the module part;

an alignment process of controlling the loading robot to align the module part with the fastening target in a fastening area; and a fastening process of controlling a fastening robot to fasten the module part to the fastening target, wherein the loading robot includes a gripper interface configured to allow automatic replacement of different types of grippers, wherein the controller is configured to select and replace a gripper type based on shape recognition of the module part to be gripped, prior to the gripping operation, and the gripping process is performed by loading robot based on a predetermined position of the module part, without using a camera.

9. The method of claim 8, wherein the alignment process is performed by controlling the loading robot based on vision information collected using a first camera disposed on the fastening robot.

10. The method of claim 8, wherein the fastening process includes:

a partial fastening process in which the fastening robot fastens only a portion of a plurality of fastening parts connecting the module part and the fastening target;

a retraction process performed after the partial fastening process, in which the loading robot retracts from the fastening area; and a remaining fastening process performed after the retraction process, in which the fastening robot fastens a remaining portion of the plurality of fastening parts.

11. The method of claim 8, further comprising:

a loading process of controlling a parts supply robot to load the module part at the predetermined position on the jig before the determination process.

12. The method of claim 11, wherein the loading process is performed while one or both of the alignment process and the fastening process are performed.

13. The method of claim 8, wherein the determination process includes determining whether the module part is loaded at the predetermined position using a proximity sensor disposed on the jig.

14. The method of claim 8, wherein in the gripping process and the alignment process, the control of the loading robot is performed based on vision information acquired by a camera disposed with the loading robot.

15. A system for fastening a module part to a target, the system comprising:

a jig configured to hold the module part at a predetermined position which is prestored in the system, wherein different module parts are arranged at different positions according to their shapes;

a first robot configured to grip the module part loaded on the jig based on a predetermined position of the module part without using a camera, and to move and align the module part to a fastening area in which the module part is to be fastened to the target based on the prestored predetermined position;

a second robot including a camera, the second robot configured to fasten the module part to the fastening target; and a controller configured to perform position-based control of the first robot and configured to perform vision-based control of the second robot using the camera, wherein the loading robot includes a gripper interface configured to allow automatic replacement of different types of grippers, and wherein the controller is configured to select and replace a gripper type based on shape recognition of the module part to be gripped, prior to the gripping operation.

* * * * *